(12) United States Patent
Ventura et al.

(10) Patent No.: US 10,612,667 B2
(45) Date of Patent: Apr. 7, 2020

(54) SEAL ASSEMBLY FOR SLIDING PARTS, IN PARTICULAR FOR PUMPS

(71) Applicants: Alessandro Ventura, Terni (IT); Luigi Massimiliano Ferri, Campello sul Clitunno (IT)

(72) Inventors: Alessandro Ventura, Terni (IT); Luigi Massimiliano Ferri, Campello sul Clitunno (IT)

(73) Assignee: MECCANOTECNICA UMBRA—S.P.A., Campello sul Clitunno (PG) (IT)

( * ) Notice: Subject to any disclaimer, the term of this patent is extended or adjusted under 35 U.S.C. 154(b) by 120 days.

(21) Appl. No.: 15/988,733

(22) Filed: May 24, 2018

(65) Prior Publication Data

US 2018/0347697 A1 Dec. 6, 2018

(30) Foreign Application Priority Data

May 31, 2017 (IT) .......................... 102017000059560

(51) Int. Cl.
*F16J 15/34* (2006.01)
*F04D 29/12* (2006.01)
*F16J 15/32* (2016.01)

(52) U.S. Cl.
CPC ....... *F16J 15/3464* (2013.01); *F16J 15/3476* (2013.01); *F04D 29/126* (2013.01); *F16J 15/32* (2013.01); *F16J 15/344* (2013.01); *F16J 15/348* (2013.01)

(58) Field of Classification Search
CPC ..... F16J 15/3464; F16J 15/348; F04D 29/126

USPC .................................................. 277/372, 373
See application file for complete search history.

(56) References Cited

U.S. PATENT DOCUMENTS

| 2,489,781 | A | * | 11/1949 | Isenbarger | ............... | F16J 15/36 |
|---|---|---|---|---|---|---|
| | | | | | | 277/373 |
| 3,578,344 | A | * | 5/1971 | Yost | .......................... | F16J 15/38 |
| | | | | | | 277/373 |
| 3,689,083 | A | | 9/1972 | Greenwalt | | |
| 3,784,213 | A | * | 1/1974 | Voitik | .................... | F16J 15/348 |
| | | | | | | 277/373 |
| 3,841,642 | A | * | 10/1974 | Kirker, Jr. | ................ | F16J 15/38 |
| | | | | | | 277/373 |

(Continued)

FOREIGN PATENT DOCUMENTS

WO    WO2006/065097 A1    6/2002

OTHER PUBLICATIONS

Search Report Form IT237 "Written Opinion" dated Jan. 16, 2018 with reference to the priority Italian Patent Application No. IT 102017000059560.

*Primary Examiner* — Nicholas L Foster
(74) *Attorney, Agent, or Firm* — Egbert, McDaniel & Swartz, PLLC

(57) ABSTRACT

A seal assembly includes a fixed seal ring, and a rotary part having a rotary seal ring with a friction edge intended to slide against a counter-track of the fixed seal ring, a receptacle connected to a rotary shaft and provided with teeth intended to be housed inside cavities obtained in a collar of the rotary seal ring in order to drive the rotary seal ring into rotation, and a protection ring disposed around the collar and provided with recessed housings intended to be disposed inside the cavities of the collar and to house the teeth of the receptacle.

7 Claims, 4 Drawing Sheets

(56) References Cited

U.S. PATENT DOCUMENTS

| | | | | |
|---|---|---|---|---|
| 4,213,618 A | * | 7/1980 | Thurber | F16J 15/348 277/373 |
| 4,779,876 A | * | 10/1988 | Novosad | F16J 15/348 277/375 |
| 7,204,490 B2 | * | 4/2007 | Huang | F16J 15/3464 277/372 |
| 7,311,307 B2 | * | 12/2007 | Dahlheimer | F16J 15/38 277/370 |
| 8,485,530 B2 | * | 7/2013 | Johansson | F04D 29/126 277/373 |
| 9,927,030 B2 | * | 3/2018 | Yoshino | F04D 29/128 |
| 2003/0122314 A1 | * | 7/2003 | Feigl | F16J 15/3452 277/377 |
| 2006/0061041 A1 | * | 3/2006 | Huang | F16J 15/3464 277/370 |
| 2015/0159758 A1 | | 6/2015 | Fonville | |
| 2016/0230892 A1 | * | 8/2016 | Yoshino | F04D 29/128 |

* cited by examiner

SEAL ASSEMBLY FOR SLIDING PARTS, IN PARTICULAR FOR PUMPS

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present patent application for industrial invention relates to a seal assembly for sliding parts, in particular for pumps.

2. Description of Related Art Including Information Disclosed Under 37 CFR 1.97 and 37 CFR 1.98

As it is known, many hydraulic components, such as for example pumps, are generally provided with a seal assembly that comprises a fixed seal ring that is integral with the pump casing, and a rotary seal ring connected to a rotary shaft of the pump and sliding on the fixed seal ring in such a way to guarantee the seal of the liquid that circulates in the pump circuit.

The rotary seal ring has a surface called "track" that slides against a counter-track of the fixed seal ring.

The rotary seal ring is driven into rotation by a receptacle connected to the shaft of the pump. The receptacle is provided with teeth that are coupled inside cavities of a collar of the rotary seal ring by means of prismatic coupling. Therefore, during the rotation of the shaft of the pump, the teeth of the receptacle are stopped against the edges of the cavities of the collar of the rotary seal ring.

The track of the rotary seal ring must be made of a very hard and fragile material, such as for example ceramic material, in particular silicon carbide (SiC), or a carbon based mix. Considering that the rotary seal ring is made in one piece, also the collar of the rotary seal ring is made of a hard and fragile material, which tends to break and crack because of the impacts with the teeth of the receptacle, especially in the areas in direct contact with the sliding teeth of the receptacle.

The purpose of the present invention is to eliminate the drawbacks of the prior art by disclosing a seal assembly for sliding parts that is safe, reliable, long-lasting, inexpensive and simple to make and install.

BRIEF SUMMARY OF THE INVENTION

These purposes are achieved according to the invention with the characteristics of the independent claim 1.

Advantageous embodiments of the invention appear from the dependent claims.

The seal assembly of the invention comprises:
a fixed seal ring mounted in a fixed casing, and
a rotary part connected to a rotary shaft.

The rotary part comprises:
a rotary seal ring with a track intended to slide against a counter-track of the fixed seal ring, and
a receptacle connected to said rotary shaft and provided with teeth intended to be housed inside cavities obtained in a collar of the rotary seal ring in order to drive said rotary seal ring into rotation.

The peculiarity of the invention is represented by the fact that the rotary part of the seal assembly comprises a protection ring disposed around the collar of the rotary seal ring. The protection ring is provided with recessed housings intended to be disposed inside the cavities of the rotary seal ring. The recessed housings of the protection ring house the teeth of the receptacle.

In view of the above, during the rotation of the rotary part, the teeth of the receptacle are stopped against the recessed housings of the protection ring, preventing damages to the collar of the rotary seal ring that is generally made of a fragile material, such as silicon carbide.

BRIEF DESCRIPTION OF THE SEVERAL VIEWS OF THE DRAWINGS

Additional features of the invention will appear manifest from the detailed description below, which refers to a merely illustrative, not limiting embodiment, as illustrated in the attached figures, wherein.

DETAILED DESCRIPTION OF THE INVENTION

Figure 1:
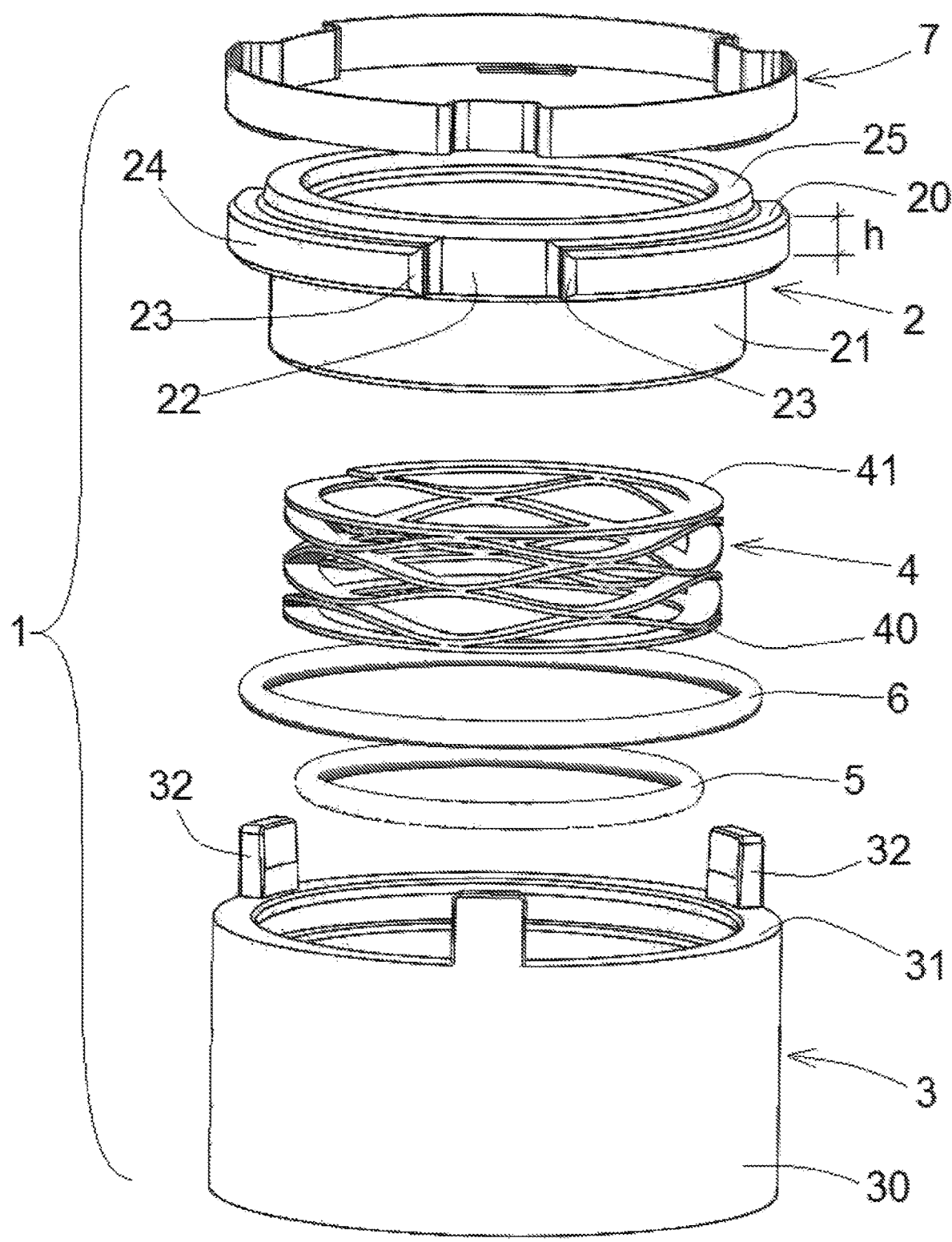
FIG. 1 is an exploded perspective view of some parts of a seal assembly according to the invention.

FIG. 1 shows a rotary part of a seal assembly according to the invention, which is generally indicated with reference numeral (1).

The rotary part (1) comprises a seal ring (2) provided with a cylindrical body (21) with a friction edge (25) intended to slide against a counter-track (not shown in the figures) of a fixed seal ring that is integral to a casing. The friction edge (25) of the cylindrical body of the seal ring represents a friction track.

A collar (20) projects radially towards the exterior of the cylindrical body (21) near the friction edge. The collar (20) has a substantially cylindrical external lateral surface (24) with a height (h).

The collar (20) has a plurality of cavities (22) formed as grooves in the collar in such a way that each cavity (22) defines two edges (23) of the collar.

Preferably, three cavities (22) that are equally spaced by 120° are provided.

Preferably, the friction edge (25) of the rotary seal ring is made of a hard material, such as for example a ceramic material, and particularly silicon carbide (SiC), or sintered carbon. The rotary seal ring (2) is made in one piece; therefore also the collar (20) is made of a hard, fragile material.

The mobile part (1) comprises a receptacle (3) with an internally hollow cylindrical body (30) with an internal diameter that is slightly larger than the external diameter of the cylindrical body (21) of the rotary seal ring.

The body (30) of the receptacle has an edge (31) from which teeth (32) project in parallel direction to the axis of the receptacle. In this example, the teeth (32) have a parallelepiped shape, but they can also have a circular, elliptical or any other shape. The number of teeth (32) of the receptacle is equal to the number of cavities (22) of the rotary seal ring.

When the cylindrical body (21) of the rotary seal ring is disposed inside the cylindrical body (30) of the receptacle, the teeth (32) of the receptacle are housed inside the cavities (22) of the collar (20) of the rotary seal ring and the collar (20) is stopped against the edge (31) of the receptacle. Clearance is left between the teeth (32) and the cavities (22).

A spring (4) is disposed inside the receptacle (3) to push the rotary seal ring (2) towards the fixed seal ring (not shown). The spring (4) has a first end (40) stopped against an internal collar of the body of the receptacle, and a second end (41) stopped against an edge of the cylindrical body (21) of the rotary seal ring opposite to the friction edge (25).

Seals (5, 6) are disposed in the body (30) of the receptacle. The seals (5, 6) can comprise two O-Ring seals with different diameter.

According to the invention, a protection ring (7) is applied around the collar (20) of the rotary seal ring in order to protect the collar (20) against the impacts of the teeth (32) of the receptacle.

Figure 2:
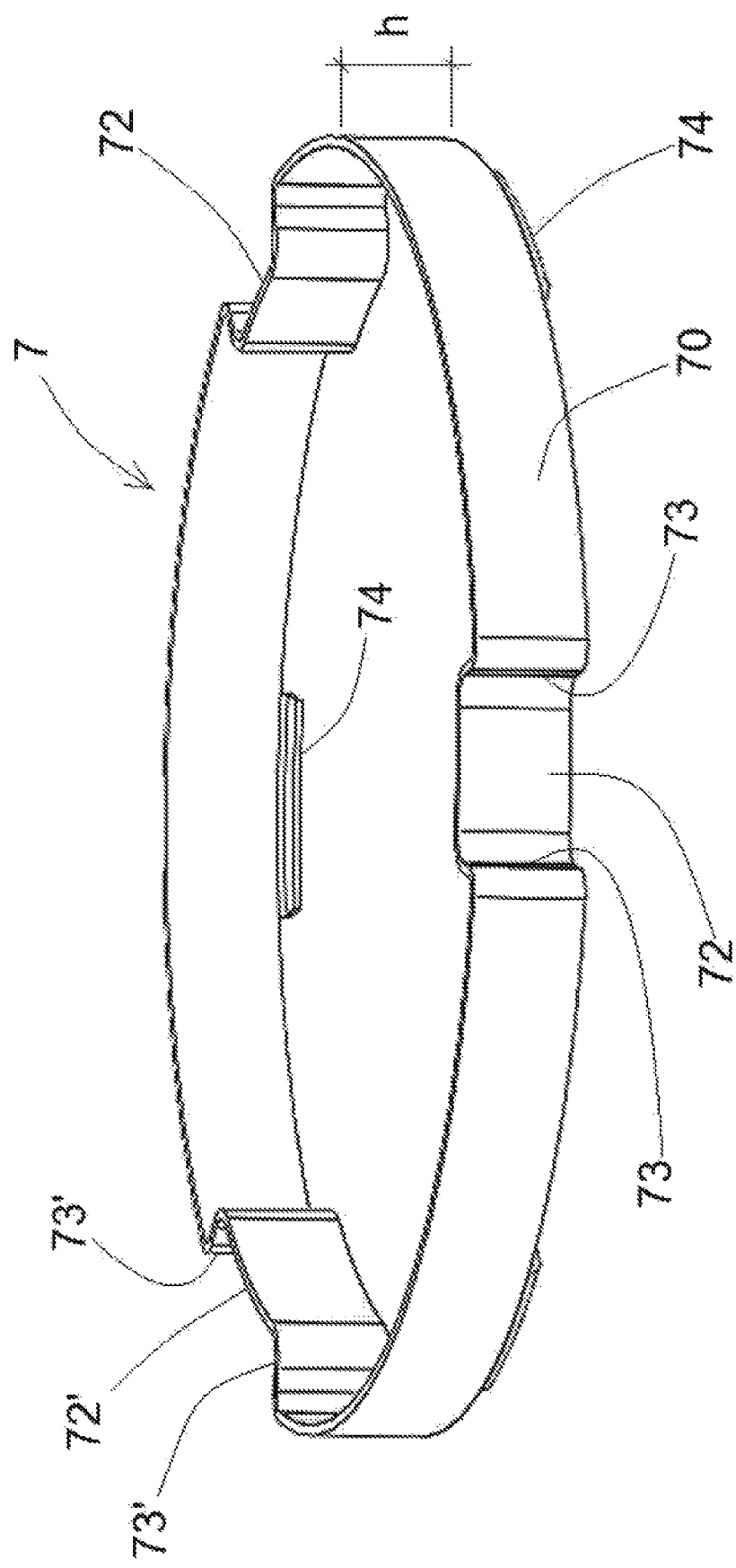
FIG. 2 is a perspective view of a protection ring of the seal assembly of FIG. 1.

With reference to FIG. 2, the protection ring (7) comprises a substantially cylindrical strap (70) with a height (h) that is substantially equal to the height of the collar (20) of the rotary seal ring and an internal diameter that is slightly higher than the external diameter of the lateral surface (24) of the collar (20), or slightly lower in such a way to create an interference with the external surface (24) of the collar (20). In view of the above, the strap (70) can be applied around the collar (20) in contact with the lateral surface (24) of the collar.

The strap (70) comprises a plurality of recessed housings (72, 72') that extend radially inwards. Each recessed housing (72, 72') forms two edges (73, 73'). The recessed housings (72, 72') of the strap are disposed in correspondence of the cavities (22) of the collar of the rotary seal ring. In view of the above, the recessed housings (72, 72') of the strap are disposed inside the cavities (22) of the collar of the rotary seal ring.

At least one recessed housing (72) has a lower width than the width of the cavity (22), in such a way to be housed with clearance inside the cavity (22). The width of the recessed housing (72) is measured as distance between the edges (73) of the recessed housing. The width of the cavity (22) is measured as distance between the edges (23) of the cavity.

At least one recessed housing (72') has a width equal to the width of the cavity (22), in such a way to be housed inside the cavity (22) without clearance. The width of the recessed housing (72) is measured as distance between the edges (73) of the recessed housing.

Figure 3:
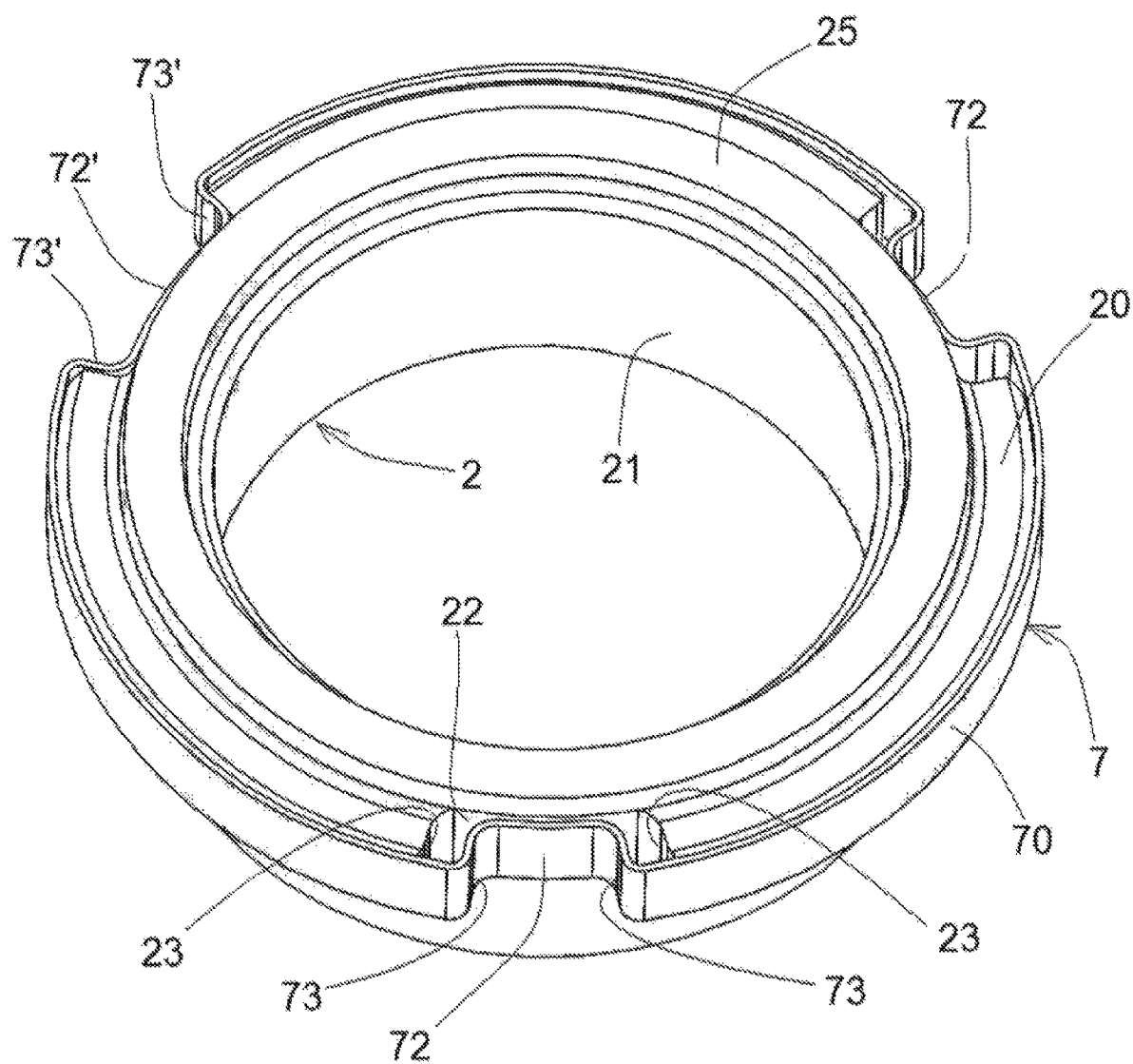
FIG. 3 is a perspective view of the protection ring mounted on a rotary seal ring of FIG. 1.

With reference to FIG. 3, if the protection ring (7) comprises three recessed housings, two recessed housings (72) are housed without clearance inside corresponding cavities and one recessed housing (72') is housed with clearance inside a cavity of the track of the rotary seal ring.

With reference to FIG. 2, the protection ring (7) comprises a plurality of retention fins (74) that protrude inwards from one edge of the strap (70) in order to be disposed under the collar (20) of the rotary seal ring and retain the protection ring (7) on the collar (20) of the rotary seal ring. The retention fins (74) are disposed in positions that are equally spaced from the recessed housings (72, 72').

The retention fins (74) can be obtained on both edges of the protection ring (7) with the same characteristics as described above.

The protection ring (7) is preferably made of stainless steel. However, the protection ring (7) can be made of other ferrous or plastic materials, such as plastics and elastomer.

FIG. 3 shows the protection ring (7) mounted on the collar (20) of the rotary seal ring (2).

Figure 4:
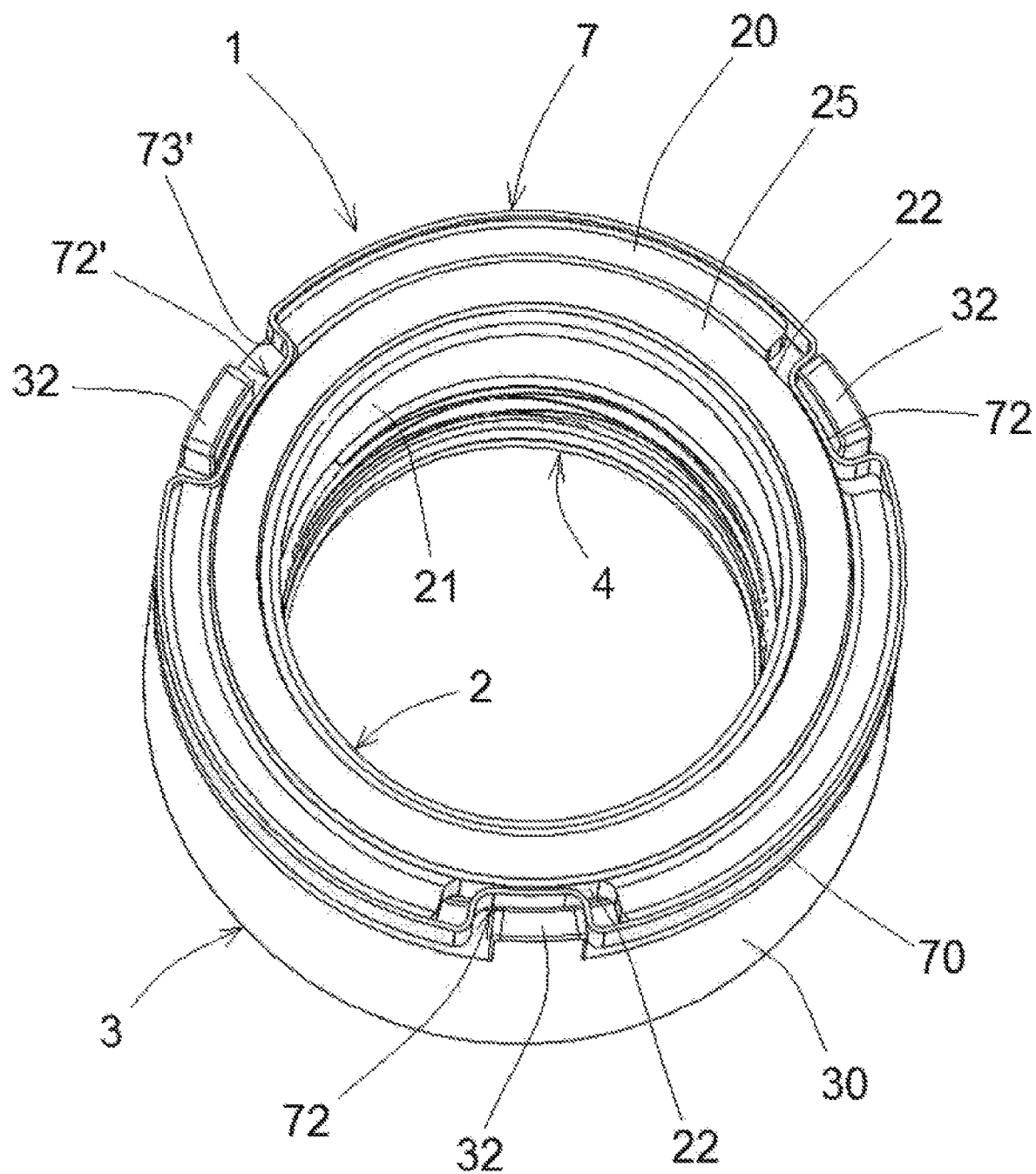
FIG. 4 is a perspective view of the parts of FIG. 1 in assembled condition.

FIG. 4 shows the rotary seal ring (2) and the protection ring (7) mounted on the receptacle (3). In such a case, the teeth (32) of the receptacle (3) are engaged in the recessed housings (72, 72') of the protection ring. In any case, the teeth (32) of the receptacle (3) are housed with clearance inside the recessed housings (72, 72') of the protection ring.

When the receptacle (3) is driven into rotation by the shaft of the pump, the teeth (32) of the receptacle hit the edges (73, 73') of the protection ring, without touching the collar (20) of the rotary seal ring. In such a way, the protection ring (7) protects the collar (20) of the rotary seal ring (2).

The fact that at least one recessed housing (72) of the protection ring is housed with clearance inside the cavity (22) of the rotary seal ring permits an elastic deformation of the protection ring (7), in such a way to absorb the energy of the impact caused by the teeth (32) of the receptacle.

The space that creates the clearance between the recessed housing (72) of the protection ring (7) and the cavity (22) of the collar (20) can be filled with materials capable of absorbing energy by means of elastic deformation, such as preformed rubber or paste.

The circular sliding of the protection ring (7) with respect to the collar (20) is prevented by the recessed housing (72') of the protection ring coupled without clearance in the corresponding cavity (22) of the collar.

Numerous variations and modifications, which are within the reach of an expert of the field, can be made to the present embodiment of the invention, falling in any case within the scope of the invention.

We claim:

1. A rotary part for a seal assembly comprising:
a fixed seal ring mounted in a fixed casing, and the rotary part connected to a rotary shaft, said rotary part comprising:
  a rotary seal ring with a cylindrical body with a friction edge intended to slide against a counter-track of the fixed seal ring, and a collar with cavities;
  a receptacle for connection to said rotary shaft and provided with teeth housed inside the cavities in the collar of the rotary seal ring in order to drive said rotary seal ring into rotation; and
  a protection ring disposed around said collar and provided with recessed housings disposed inside said cavities of the collar and housing said teeth of the receptacle.

2. The rotary part for the seal assembly of claim 1, wherein the protection ring comprises a substantially cylindrical strap.

3. The rotary part for the seal assembly of claim 2, wherein the collar protrudes radially from the cylindrical body of the rotary seal ring, the collar having a lateral surface with a height, wherein the substantially cylindrical strap of the protection ring has a height substantially equal to the height of the lateral surface of the collar of the rotary seal ring and an internal diameter that is slightly greater than an external diameter of the lateral surface of the collar, or slightly lower in such a way to obtain a forced coupling with interference with an external surface of the collar.

4. The rotary part for the seal assembly of claim 1, wherein each of the cavities of the collar is defined as a groove of the collar with two edges, wherein each of the recessed housings of the protection ring has two edges.

5. The rotary part for the seal assembly of claim 1, wherein the cavities of the collar of the rotary seal ring comprise three cavities that are equally spaced by 120°, and wherein the recessed housings of the protection ring comprise three recessed housings that are equally spaced by 120°.

6. The rotary part for the seal assembly of claim 5, wherein one of the recessed housings of the protection ring is housed inside one of the cavities of the collar of the rotary seal ring and wherein the other two housings of the protection ring are housed inside corresponding other cavities of the collar of the rotary seal ring.

7. The rotary part for the seal assembly of claim 1, wherein said protection ring is formed of a ferrous material, a plastic material or an elastomer.

* * * * *